(12) United States Patent
Tay et al.

(10) Patent No.: US 11,929,074 B2
(45) Date of Patent: *Mar. 12, 2024

(54) AUTOMATICALLY GENERATING A MEETING SUMMARY FOR AN INFORMATION HANDLING SYSTEM

(71) Applicant: Dell Products L.P., Round Rock, TX (US)

(72) Inventors: Benedict Tiong Chee Tay, Singapore (SG); Mark John Law, Singapore (SG); Chin Leong Ong, Singapore (SG); Jonathan Sebastian Yarborough Wood, Singapore (SG); Li Weixian, Singapore (SG); Yunguo Chen, Singapore (SG)

(73) Assignee: Dell Products L.P., Round Rock, TX (US)

( * ) Notice: Subject to any disclaimer, the term of this patent is extended or adjusted under 35 U.S.C. 154(b) by 337 days.

This patent is subject to a terminal disclaimer.

(21) Appl. No.: 17/173,905

(22) Filed: Feb. 11, 2021

(65) Prior Publication Data

US 2022/0254348 A1    Aug. 11, 2022

(51) Int. Cl.
G10L 15/26 (2006.01)
G06F 16/34 (2019.01)
H04L 12/18 (2006.01)

(52) U.S. Cl.
CPC ............ *G10L 15/26* (2013.01); *G06F 16/345* (2019.01); *H04L 12/1831* (2013.01)

(58) Field of Classification Search
None
See application file for complete search history.

(56) References Cited

U.S. PATENT DOCUMENTS

2018/0060289 A1*  3/2018  Grueneberg ......... H05K 999/99
2019/0273767 A1*  9/2019  Nelson ................ H04M 7/0027

* cited by examiner

*Primary Examiner* — Antim G Shah
(74) *Attorney, Agent, or Firm* — Norton Rose Fulbright US LLP

(57) ABSTRACT

A method and apparatus for automatically generating a meeting summary is disclosed herein. Meeting audio is recorded and converted into a text-based transcript. Handwritten meeting notes are converted into notes text. The transcript and notes text are correlated to provide correlated meeting text. Meeting topics are determined from the correlated meeting text. A meeting summary is generated from the meeting topics.

17 Claims, 8 Drawing Sheets

Transcription details:
  Date:                12-Feb-2018
  Input sound file:    The future we're building - and boring | Elon Musk
Transcription results:

S1 00:13  [music][applause] Elon, hey, welcome back to TED. It's great to have you here.
S2 00:17  Thanks for having me.
S1 00:18  So in the next half hour or so, we're going to spend some (Sam) oring your vision 602
          for what an exciting future might look like, which, I guess, makes the first question
          ironic. Why are you boring?                                       Topic 1
(Mark) 33  Yeah. I ask myself that frequently. We're trying to dig a hole under LA. And this is    Topic 1: Visualization
(CL)       to create the beginning of what will hopefully be a 1D network of tunnels to alleviate   of 3D tunnel network
           congestion.                                                                              Attention/interest: High ~~~~ particularly horrible in LA [laughter]. And so- S1 01:12  I think you've brought with you the first visualization that's been shown of this.
          Can I show this?
S1 01:12  Yeah. Absolutely. So this is the first time —just to sort of show what we're talking
          about, so a couple of key things that are important in having a 3D tunnel network.

S1 01:59  How much?
S2 02:00  200 kilometers an hour or about 130 miles per hour. So you should be able to get
          from, say, Westwood to LAX in six minutes, five, six minutes [laughter][applause].
S1 02:17  So possibly, initial (CL) on a sort of toll road-type basis, which, I guess, alleviates  604
          some traffic from the surface streets, as well.                Topic 2
(Mark) 7  So I don't if people noticed it in the video, but there's no real limit to how           Topic 2: Limits on how
          many levels of tunnel you can have.                                                      many levels of tunnel one
                                                                                                   can have Attention/
                                                                                                   interest: Medium ~~ But you can go to any arbitrary number of tunnels, any number of levels.
                                                                                        To
                                                                                        FIG. 6B  FIG. 6A S1 03:06  But people seem, traditionally it's incredibly expensive to dig. And that would block this idea.

S2 03:11  Yeah. Well, they're right. To give you an example, the LA subway extension, which is, I think, it's a two and a half mile extension, S1 03:44  And how could you achieve that?

Topic 3

606

Topic 3: Solution to achieve
Attention/Interest: Low

AUTOMATICALLY GENERATING A MEETING SUMMARY FOR AN INFORMATION HANDLING SYSTEM

FIELD OF THE DISCLOSURE

The instant disclosure relates to information handling systems. More specifically, portions of this disclosure relate to automatically compiling meeting transcripts and meeting notes and generating a meeting summary therefrom.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Meeting participants frequently take notes to capture what is discussed in meetings. These meeting notes take the form of handwritten notes using pen and paper or typed using a portable computer. There are several shortcomings with current methods of capturing and summarizing meeting content via participants taking notes during meetings. Meeting participants frequently feel the need to take notes on all matters discussed to have a record of everything that transpired in the meeting. Unfortunately, taking notes on all matters requires a great deal of time and attention and thus decreases the participant's opportunity to participate in the ongoing discussion. Handwritten notes are difficult to share with other participants or non-participants. Often the participant or another person must type up the handwritten notes before they can be shared with others. Participants may not have access to the unspoken viewpoints of other participants because participants do not share their notes with the other participants. Participants may also have difficulty reviewing their notes after the meeting to determine which matters are important for the summary. Moreover, without access to notes shared by other participants, any single individual's notes reflects only a single participant's viewpoint, which may place importance on certain topics inaccurately.

Shortcomings mentioned here are only representative and are included to highlight problems that the inventors have identified with respect to existing information handling systems and sought to improve upon. Aspects of the information handling systems described below may address some or all of the shortcomings as well as others known in the art. Aspects of the improved information handling systems described below may present other benefits than, and be used in other applications than, those described above.

SUMMARY

The processing of user notes may be improved through one or more software and/or hardware solutions that process notes generated from multiple users and/or across multiple devices. Various embodiments of the disclosure may include algorithms for processing user files for determining items from notes and meetings, detection of key items from the items (such as by identifying commonly used words, and processing text using part of speech tagging and tenses detection to identify action and decided items), ranking of the items (to assign importance to the detected items based on agenda of the meeting, sentiment analysis, and/or named entity recognition), and/or summarization of the items (by extracting key and relevant context of notes from multiple users and/or devices through deep learning methods to identify context and infer understanding based on the model). In embodiments of the disclosure, an information handling system may determine the importance of meeting action items based on a meeting agenda, meeting transcript, and/or notes provided by meeting participants. In some embodiments, action item importance is determined based on applying sentiment analysis to the meeting agenda, meeting transcript, and/or meeting notes. In some embodiments, meeting topic importance is determined based on applying named entity recognition on the meeting agenda, meeting transcript, and/or notes and identifying titles of recognized named entities. In embodiments of the disclosure, an information handling system may determine the importance of meeting topics based on notes provided by meeting participants. In some embodiments, meeting topic importance is determined based on the number of participants taking notes on the topic. In other embodiments, meeting topic importance is determined based on the cumulative length of notes taken on the topic.

One example hardware device for contributing notes regarding a meeting is a companion device, which may provide handwritten or typed notes and timestamps to accompany the notes, and in some embodiments, timestamps of individual pieces of the notes. The companion devices may provide handwritten or typed notes and notes timestamps. The companion devices or videoconferencing service provide an audio recording of a meeting and audio timestamps. A server converts handwritten notes into text-based notes and the audio recording into a text-based transcript. The server correlates the text-based notes to the transcript by matching the audio timestamps to the notes timestamps. Natural language processing determines topics from the notes and transcript. Machine learning generates a meeting summary from the topics. In some embodiments, the meeting summary is the meeting topics listed in descending order of importance. In other embodiments, the meeting summary is a heatmap of meeting topics.

Some example use cases for the notes processing are described in the following examples. In one use case, Jimmy starts a meeting with Lynn and James offline. Jimmy enables the live transcription function to record and immediately transcribe notes with the built-in mic on the stylus. Lynn and James joined the collaborative note session to view the live transcript. While the three of them are taking notes, the timestamp and handwritten notes were recorded throughout the session and tied to the live transcript through timestamps. A topic heat map, which topics are identified from a group of users, tied to the live transcript can be generated by determining an amount of the users taking notes for a particular topic in a meeting.

In another use case, Jimmy and other users join a meeting online with a video conference service offering transcription while taking handwritten notes on a companion device. After the meeting, a software service integrates the meeting transcription with handwritten notes from various users. Each individual note may be tied to a topic based on a timestamp and topic modeling. A topic heat map tied to the post-meeting transcript may be generated by determining an amount of the users taking note for a particular topic in a meeting.

In a further use case, based on the topic heat map, natural language processing (NLP) techniques may be applied to select and model the topics for a meeting summary. All the meeting attendees may be able to view their own notes, topics heat map, and summarized notes and aggregated notes tied to the determined topics from the meeting.

According to one embodiment, a method may include receiving a meeting record comprising a record of words spoken during a meeting and meeting timestamps comprising times when the words were spoken, receiving meeting notes comprising notes written by one or more meeting participants and notes timestamps comprising times when the meeting notes were written, correlating the meeting notes to the meeting record to generate correlated meeting text, wherein the correlating step comprises matching the notes timestamps to the meeting timestamps and wherein the correlated meeting text comprises the meeting record and the meeting notes, determining topics from the correlated meeting text, determining an importance score associated with each topic based, at least in part, on the correlated meeting text, and generating a meeting summary comprising the topics and associated importance scores.

In certain embodiments, the method may further include converting the meeting record from audio data into text data after receiving the meeting record and wherein the correlated meeting text comprises the text data. In certain embodiments, the method may further include converting the meeting notes from handwritten symbols into text data after receiving the meeting notes and wherein the correlated meeting text comprises the text data. In certain embodiments, the meeting summary may further include a word heat map. In certain embodiments, the meeting summary may further include a prioritized meeting topic list. In certain embodiments, the estimating step may further include counting a counting a number of meeting participants that took meeting notes corresponding to the topic. In certain embodiments, the estimating step may further include counting a number of words in the meeting notes corresponding to the topic.

According to another embodiment, a processor may be configured to execute an audio processing service, an optical character recognition service, a natural language processing service, and a machine learning service, wherein the audio processing service converts meeting audio into a meeting transcript, the optical character recognition service converts handwritten notes into notes text, the natural language processing service converts the meeting transcript into meeting topics, the natural language processing service converts the notes text into notes topics, the machine learning service correlates the meeting topics with the notes topics to create correlated topics by matching meeting timestamps to notes timestamps, and the machine learning service creates a meeting summary by summarizing the correlated topics.

In certain embodiments, the processor may be further configured to execute a dashboard, wherein meeting participants view the meeting summary by accessing the dashboard. In certain embodiments, the machine learning service may determine an importance score of a topic by counting a number of meeting participants that took meeting notes corresponding to the topic. In certain embodiments, the machine learning service may determine an importance score of a topic by counting a number of words in the meeting notes corresponding to the topic.

The method may be embedded in a computer-readable medium as computer program code comprising instructions that cause a processor to perform the steps of the method. In some embodiments, the processor may be part of an information handling system including a first network adaptor configured to transmit data over a first network connection of a plurality of network connections; and a processor coupled to the first network adaptor, and the memory. In some embodiments, the network connection may couple the information handling system to an external component.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

FIGS. 6A-B illustrate an example of topics overlaid on a meeting transcript reflecting a correlation between the information contained in the transcript and handwritten notes.

DETAILED DESCRIPTION

Figure 1:
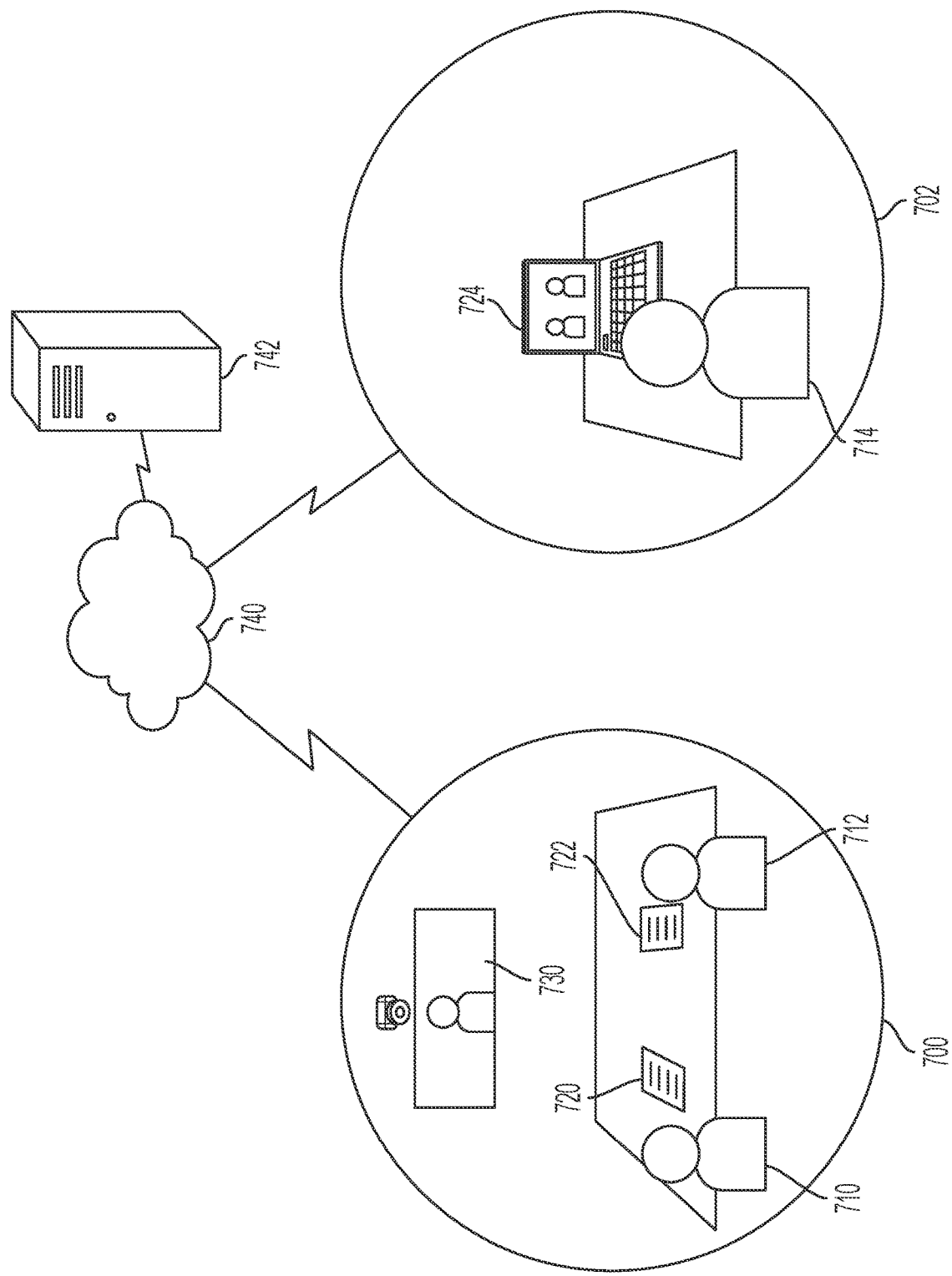
FIG. 1 illustrates an example meeting environment in which embodiments of the disclosure may be used.

FIG. 1 depicts participants 710, 712, and 714 meeting together. Participants 710 and 712 are located in conference room 700. Participant 714 is located in home office 702. Participants 710 and 712 may communicate with participant 714 through a videoconferencing service. Alternatively, participants 710 and 712 may communicate with participant 714 through an audio only telephone call. Monitor 730 located in conference room 700 may present audio and video of participant 714. Laptop 724 may present audio and video of participants 710 and 712.

Participant 710 may take meeting notes on companion device 720, and participant 712 may take notes on companion device 722. Companion devices 720 and 722 may be tablet-based computing devices. Participants 710 and 712 may take handwritten notes on companion devices 720 and 722 using a stylus or finger. Companion devices 720 and 722 may record note timestamps that indicate the times when notes were taken. A timestamp may be recorded when each sentence is completed. Alternatively, a timestamp may be recorded when there is a pause in note taking greater than a predefined number of seconds. Companion devices 720 and 722 may convert the handwritten meeting notes into text using optical character recognition (OCR). Participant 714 may take typewritten meeting notes using laptop 724. Laptop 724 may record note timestamps that indicate the times when notes were taken. Companion devices 720 and 722 may record meeting audio, including audio timestamps. Audio timestamps mark the times when the audio occurred.

Companion devices 720 and 722 may upload one or more of the meeting notes, note timestamps, meeting audio, and/or audio timestamps to server 742. Alternatively, the video conferencing service may upload the meeting audio and/or audio timestamps to server 742. Laptop 724 may upload the meeting notes and/or note timestamps to server 742. Companion devices 720 and 722 and laptop 724 may upload to the server 742 in near real time, at designated time periods, or after the meeting is complete. Server 742 may be located on the cloud 740, and companion devices 720 and 722 and laptop 724 may connect to server 742 via the Internet. Alternatively, server 742 may be located in the same building as conference room 700, and companion devices 720 and 722 may connect to server 742 via a local area network.

After the meeting notes, note timestamps, meeting audio, and audio timestamps have been uploaded, server 742 may convert the handwritten meeting notes to text using OCR if the meeting notes have not already been converted. Server 742 may convert the meeting audio into a text-based meeting transcript. Alternatively, server 742 may transmit the meeting audio to a third party for conversion into a text-based meeting transcript. Server 742 may then correlate the meeting notes to the transcript to generate correlated meeting text by matching the note timestamps with the audio timestamps. Server 742 may determine topics from the correlated meeting text to generate a meeting summary.

Figure 2:
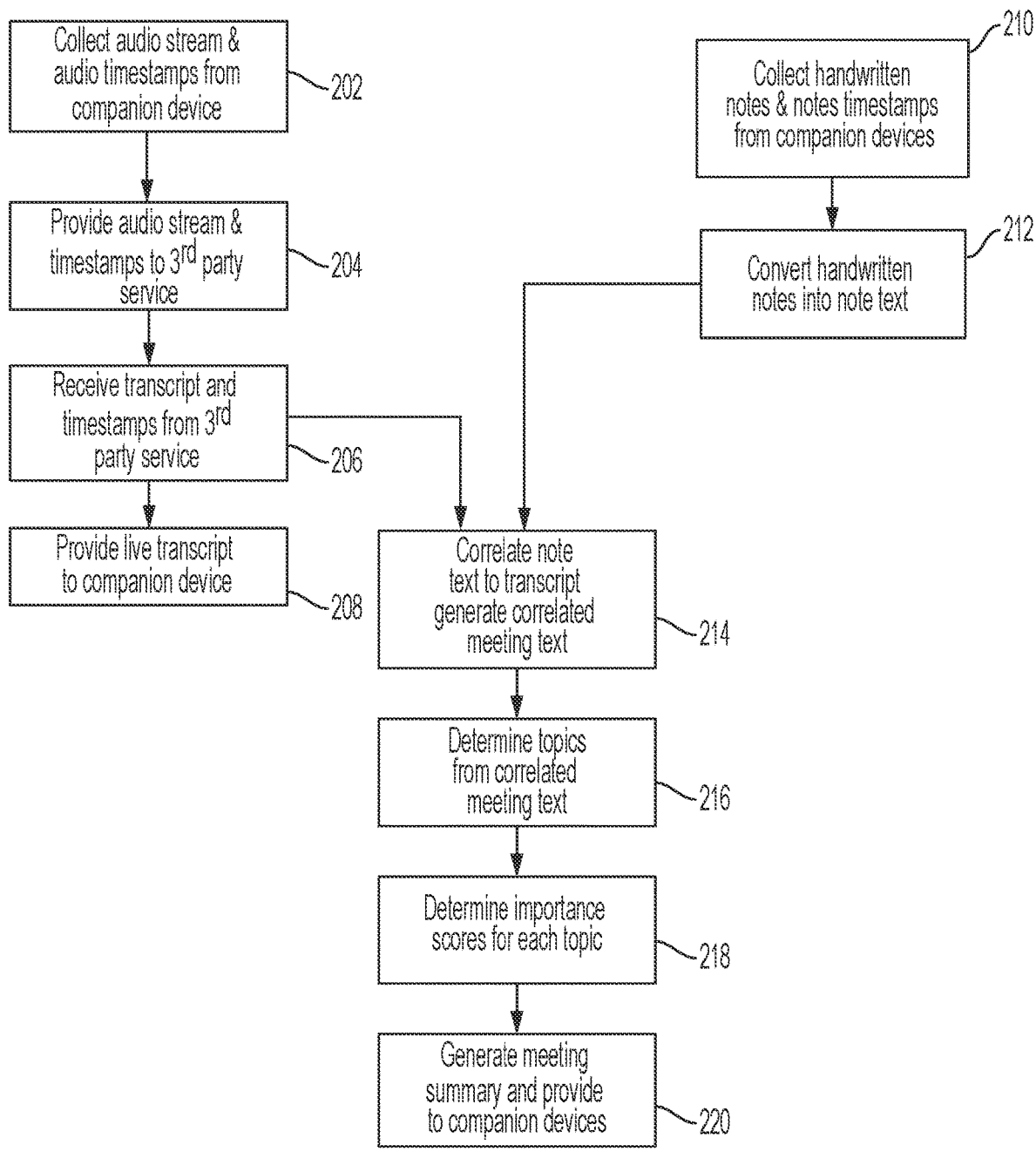
FIG. 2 illustrates an example process by which a server collects meeting audio and meeting notes and generates a meeting summary according to some embodiments of the disclosure.

In step 202 of FIG. 2, server 742 receives an audio stream and audio timestamps from a companion device. The audio stream comprises a near real time audio feed of the meeting taking place. The audio timestamps comprise the times in which the audio of the audio stream occurred. The server then transmits the audio stream and audio timestamps to a third-party service in step 204. The third-party service converts the audio stream into a text-based transcript. In step 206, the server receives from the third-party service the text-based transcript and text timestamps. The text timestamps provide times of the words spoken in the text-based transcript. In step 208, the server provides the text-based transcript to the companion device in near real time.

The server in step 210 collects handwritten notes and notes timestamps from the companion device. The handwritten notes may be taken on top of or in line with the text-based transcript displayed on the companion device. The companion device transmits the handwritten characters of the notes periodically. The companion device may transmit after every word or every line is completed. Notes timestamps indicate the times in which the handwritten notes were taken. In step 212, the server converts the handwritten notes to text-based note text using OCR. In one embodiment, the server may transmit the handwritten notes to a third-party service for conversion and may receive text-based note text from the third-party service.

In step 214, server 742 correlates the note text to the transcript to generate correlated meeting text by matching the audio timestamps to the notes timestamps. For example, at 9:52 am, a portion of the transcript of the spoken meeting may read, " . . . Last year revenue increased by 10% and profitability increased by 12% . . . ." The note text from participant Mary at 9:52 am may state, "Revenue up 10%, profit up 12%." The note text from participant John may be written below "Last year revenue increased by 10% and profitability increased by 12%"; John's note may state, "Increased sales to $50M, net income to $3.2M." Additionally, participants Jennifer and Eric may also underline the sentence "Last year revenue increased by 10% and profitability increased by 12%" in the transcript. The server correlates the sentences "Last year revenue increased by 10% and profitability increased by 12%," "Revenue up 10%, profit up 12%," and "Increased sales to $50M, net income to $3.2M." The server correlates Mary's sentence because the timestamps her sentence is at or about 9:52 am. The server correlates John's sentence because of the position of his handwriting with respect to the transcript displayed on his companion device.

The server in step 216 determines topics from the correlated meeting text using natural language processing and/or user input. As one example, the server may determine the topics based on a user providing the topics being discussed. As another example, the server may determine as the topics the keywords that are most frequently used in the transcript. As another example, the server may determine as the topics the text in the transcript that occurs after a detected meeting break. As an additional example, the server may determine as topics the bulleted items in a meeting agenda circulated before the meeting. As a further example, the server may determine as the topics the sub-headings for a presentation file presented during the meeting. As an additional example, the server may determine as topics the portion of the correlated meeting text in which participants took notes. Using the example above, the server may recognize that the transcript at 9:52 am contains a topic because Mary took notes at that time. The server may further recognize that the transcript at 9:52 am contains a topic because of the position of John's handwriting. The server may also recognize that the transcript at 9:52 am contains a topic because of Jennifer's and Eric's underlining. The server's natural language processing (NLP) may recognize that the words "revenue" and "sales" are synonyms, and "profit" and "net income" are synonyms, and "increase" and "up" are synonyms. The server generates from the correlated meeting text the following topics: "Increased revenue by 10% to $50M" and "Increased profitability by 12% to $3.2M."

In step 218, the server determines importance scores for each topic. In some embodiments, the importance scores are based upon the number of meeting participants who took notes corresponding to each topic. In other embodiments, the importance scores are based upon the length of the meeting notes corresponding to each topic. Using the example above, the server determines that the topics "Increased revenue by 10% to $50M" and "Increased profitability by 12% to $3.2M" have an importance score of 100, indicating highest importance, because two participants took notes and two participants underlined text corresponding to these topics.

After the meeting concludes, the server generates a meeting summary in step 220 and provides the summary to companion devices. In some embodiments, the meeting summary lists the meeting topics in descending order of importance. In other embodiments, the meeting summary may be a topic heatmap. Using the above example, the subject of the meeting summary may be "Annual Financial Review Meeting Summary." The first two topics listed in the meeting summary may be "Increased revenue by 10% to $50M" and "Increased profitability by 12% to $3.2M." As another example, the two largest topics near the center of the meeting summary heatmap may be "Increased revenue by 10% to $50M" and "Increased profitability by 12% to $3.2M."

Figure 3:
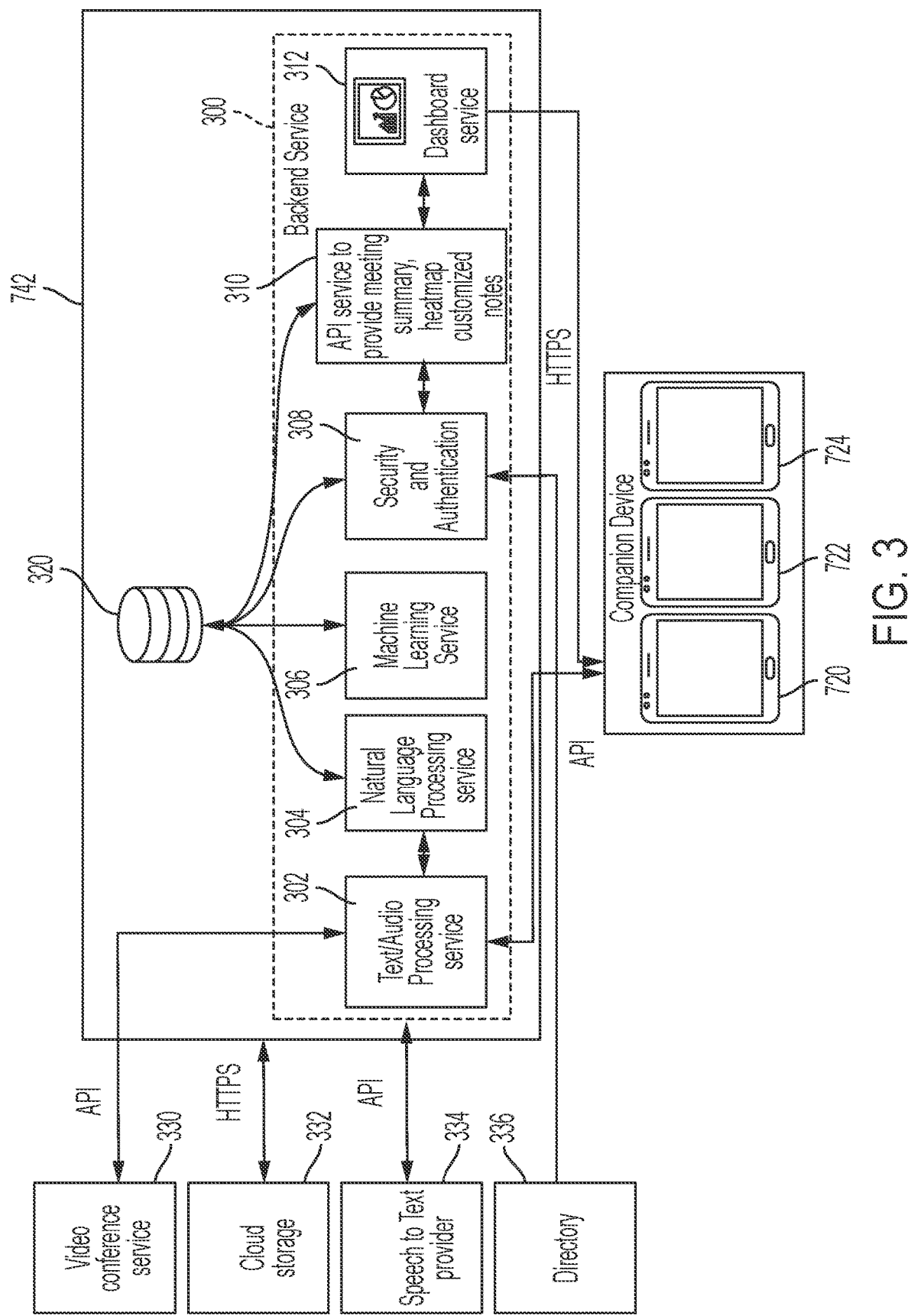
FIG. 3 illustrates an example architecture of a server in relation to companion devices and third-party services for processing notes according to some embodiments of the disclosure.

Server 742 in FIG. 3 may comprise one or more physical servers. Server 742 may execute a text and audio processing service 302, natural language processing service 304, machine learning service 306, security and authentication service 308, API service 310, dashboard service 312, and database cluster 320.

Text and audio processing service 302 may use OCR to convert handwritten notes into notes text. Text and audio processing service 302 may convert meeting audio into a text-based meeting transcript. Alternatively, text and audio processing service 302 may forward the meeting audio to a third-party speech-to-text provider 334 via an API and receive a meeting transcript. In some embodiments, text and audio processing service 302 receives meeting audio and audio timestamps from companion device 720 through an API. In other embodiments, text and audio processing service 302 receives meeting audio and audio timestamps from video conference provider 330 through an API. Text and audio processing service 302 generates correlated meeting text from the meeting transcript and notes text by matching the notes timestamps to the audio timestamps.

Natural language processing service 304 determines topics from the correlated meeting text. Natural language processing, as described herein, may comprise symbolic, statistical, neural networks, deep learning, word embedding, named entity recognition, sentiment analysis, sentence segmentation, extraction, tokenization, stemming and lemmatization, bag of words, abstraction, aspect mining, latent semantic analysis, probabilistic latent semantic analysis, latent Dirichlet allocation, and correlated topic model techniques.

Machine learning service 306 generates the meeting summary from the topics. Machine learning models, as described herein, may include logistic regression techniques, linear discriminant analysis, linear regression analysis, artificial neural networks, machine learning classifier algorithms, or classification/regression trees in some embodiments. In various other embodiments, machine learning systems may employ Naive Bayes predictive modeling analysis of several varieties, learning vector quantization artificial neural network algorithms, or implementation of boosting algorithms such as Adaboost or stochastic gradient boosting systems for iteratively updating weighting to train a machine learning classifier to determine a relationship between an influencing attribute, such as received environmental data, and a system or environmental characteristic and/or a degree to which such an influencing attribute affects the outcome of such a system or environmental characteristic.

Security and authentication service 308 may authenticate meeting participants. Authentication of the meeting participants may occur before accepting notes from the companion devices. Authentication may occur when a meeting participant or other user attempts to access the dashboard service 312. Security and authentication service 308 may communicate with Active Directory server 336 to authenticate the meeting participant or user. Dashboard service 312 may provide meeting summaries to meeting participants and other users. Security and authentication service 308 may restrict what summaries and other types of output a user may access from the dashboard service 312. Dashboard service 312 may provide meeting summaries in the form of meeting topics in descending order of importance. Dashboard service 312 may provide meeting summaries in the form of a topic heatmap. Dashboard service 312 may be a web portal. Meeting participants and users may access dashboard service 312 via HTTPS.

API service 310 transmits text-based meeting transcripts to companion devices. Transmission may occur in near real time or as a single batch after the meeting has concluded. API service 310 may transmit over Secure Hypertext Transfer Protocol (HTTPS) or another protocol. Authentication of the meeting participants may occur before the API service 310 provides live transcripts to the companion devices.

Server 742 may comprise a database 320. Alternatively, database 320 may be located on a computer physically separate from server 742. Natural language processing service 304, machine learning service 306, security and authentication service 308, API service 310, and dashboard service 312 may store and retrieve data from database 320. In other embodiments, natural language processing service 304, machine learning service 306, security and authentication service 308, API service 310, and dashboard service 312 may store and retrieve data from third-party cloud storage 332. Communication from server 742 and cloud storage 332 may use HTTPS or another protocol.

Figure 4:
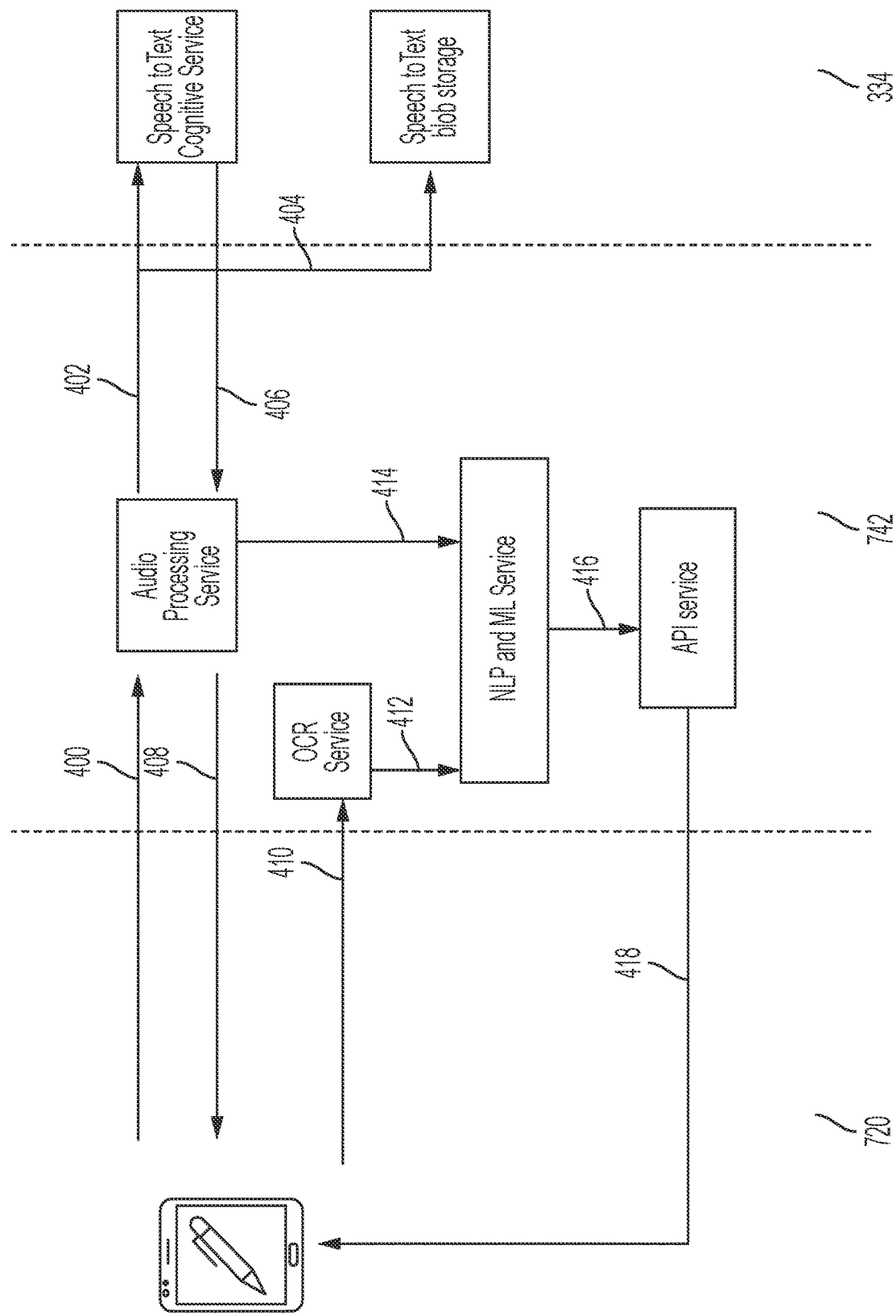
FIG. 4 illustrates an example transmission of data regarding meeting notes according to some embodiments of the disclosure.

FIG. 4 illustrates an exemplary transmission of data between companion device 720, server 742, and speech-to-text provider 334. In transmission 400, companion device 720 sends meeting audio and audio timestamps to text and audio processing service 302 of server 742. Transmission 402 comprises text and audio processing service 302 sending meeting audio and audio timestamps to speech-to-text provider 334. Transmission 404 may comprise text and audio processing service 302 sending meeting audio and audio timestamps to speech-to-text blob storage. In transmission 406, speech-to-text provider 334 sends text-based meeting transcript, speaker IDs, and audio timestamps to audio processing service 302. Text and audio processing service 302 sends meeting transcript to companion device 720 in transmission 408.

In transmission 410, companion device 720 sends handwritten meeting notes, notes timestamps, and participant information to text and audio processing service 302. Transmission 410 may comprise the position of handwritten meeting notes with respect to transcript text displayed on the companion device. Transmission 412 comprises the text and audio processing service 302 sending the text-based meeting notes, notes timestamps, and participant information to the natural language processing service 304 and machine learning service 306. In transmission 414, text and audio processing service 302 sends the meeting transcript, speaker information, and meeting timestamp to natural language processing service 304 and machine learning service 306. Transmission 416 comprises the machine learning service 306 sending the meeting summary and topic metadata to the API service. Transmission 418 comprises the API sending the meeting summary and topic metadata to the companion device 720.

Figure 5:
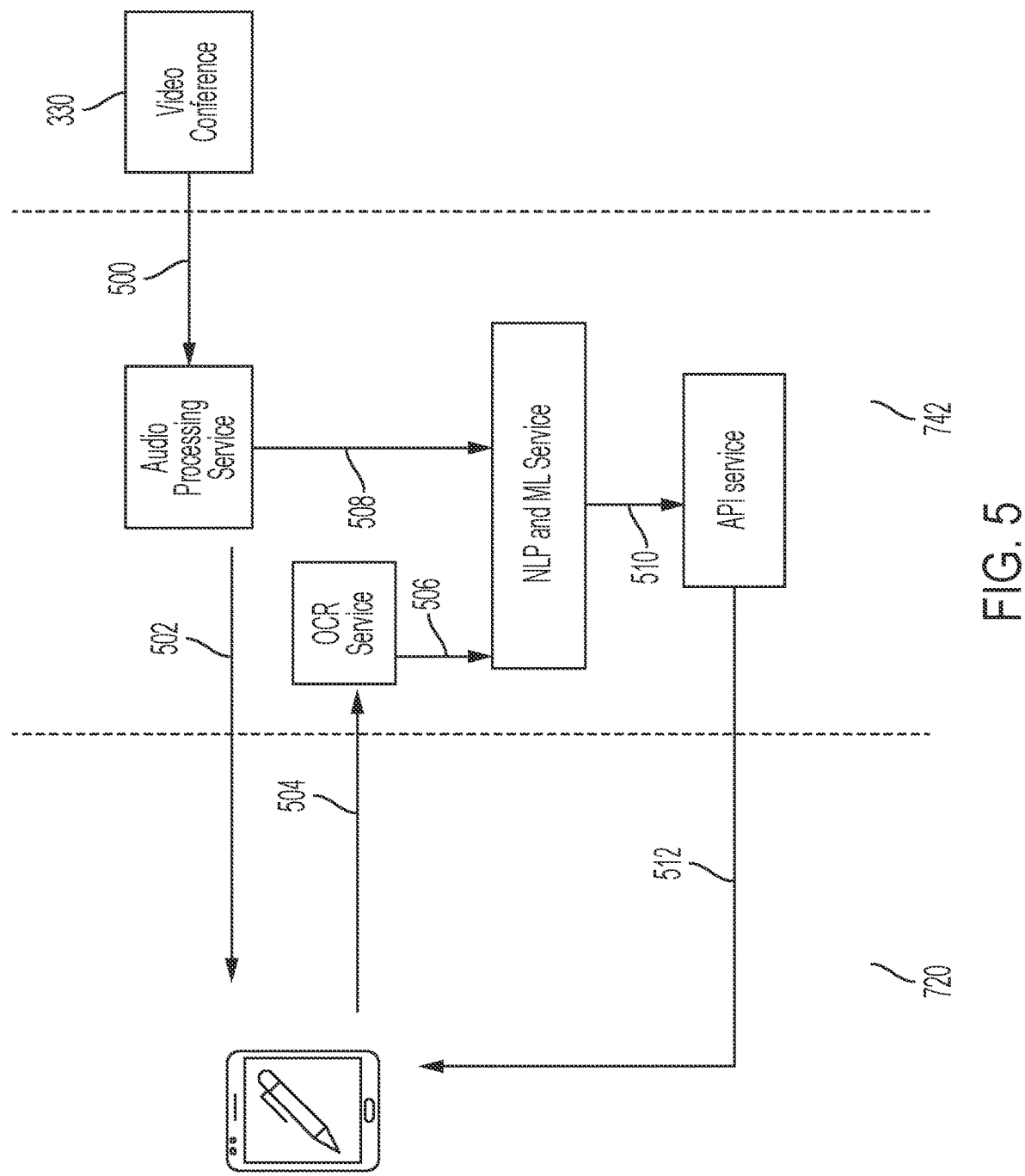
FIG. 5 illustrates another example transmission of data regarding meeting notes according to some embodiments of the disclosure.

FIG. 5 illustrates an exemplary transmission of data between companion device 720, server 742, and third-party videoconference service 330. In transmission 500, videoconference service 330 sends a meeting transcript, speaker ID, and meeting timestamps to text and audio processing service 302. In transmission 502, text and audio processing service 302 sends the meeting transcript to companion device 720. Transmission 504 comprises companion device 720 sending handwritten meeting notes, notes timestamps, and participant information to text and audio processing service 302. Text and audio processing service 302 sends text-based meeting notes, notes timestamps, and participant information to the natural language processing service 304 and machine learning service 306 in transmission 506. In transmission 508, text and audio processing service 302 sends the meeting transcript, speaker information, and meeting timestamp to natural language processing service 304 and machine learning service 306. Transmission 510 comprises the machine learning service 306 sending the meeting summary and topic metadata to the API service. Transmission 512 comprises the API sending the meeting summary and topic metadata to the companion device 720.

Figure 6B:
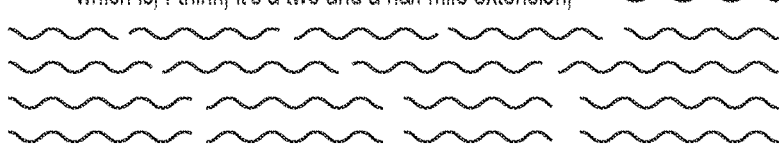
Figure 6B:
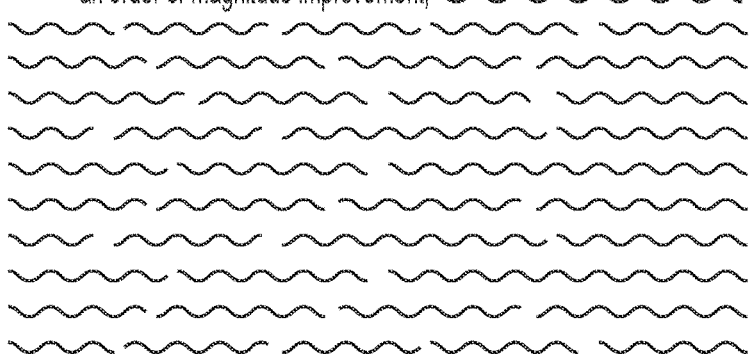

Example processing of using the natural language processing service and/or the machine learning service on correlated information based on timestamps between the meeting notes, transcript, and agenda is shown in FIGS. 6A-B The upper portion of the transcript shown in FIGS. 6A-B is summarized as Topic 1 602, which is "Visualization of 3D tunnel network." The middle portion of the transcript is summarized as Topic 2 604, which is "Limits on how many levels of tunnel on can have." The lower portion of the transcript is summarized as Topic 3 606, which is "Solution to achieve." Mark, C L, Ben, and Sam have taken notes during the portion of the meeting corresponding to Topic 1. Because four meeting participants took notes on this topic, Topic 1 is flagged as high importance. Whether a participant took notes on a particular topic may be determined based on determining whether a participant took notes that have timestamps within a certain threshold time range around a time that the topic is mentioned in the transcript. Whether a participant took notes on a particular topic may also be based on determined by determining from an OCR of the participant's notes, whether the topic or keywords related to the topic are included in the participant's notes. Whether a participant took notes on a particular topic may also be based on determining the position of the handwriting on the companion device screen with respect to the display of the real time transcript. Mark and CL have taken notes during the portion of the meeting corresponding to Topic 2. Because two meeting participants took notes on this topic, Topic 2 is flagged as medium importance. No participants took notes during the portion of the meeting corresponding to Topic 3. Because no meeting participants took notes on this topic, Topic 2 is flagged as low importance.

These example embodiments describe and illustrate various aspects of an information handling system. In this information handling system, meeting audio, meeting notes, and timestamps are inputs to the system. The information handling system outputs meeting transcripts and a meeting summary.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 7:
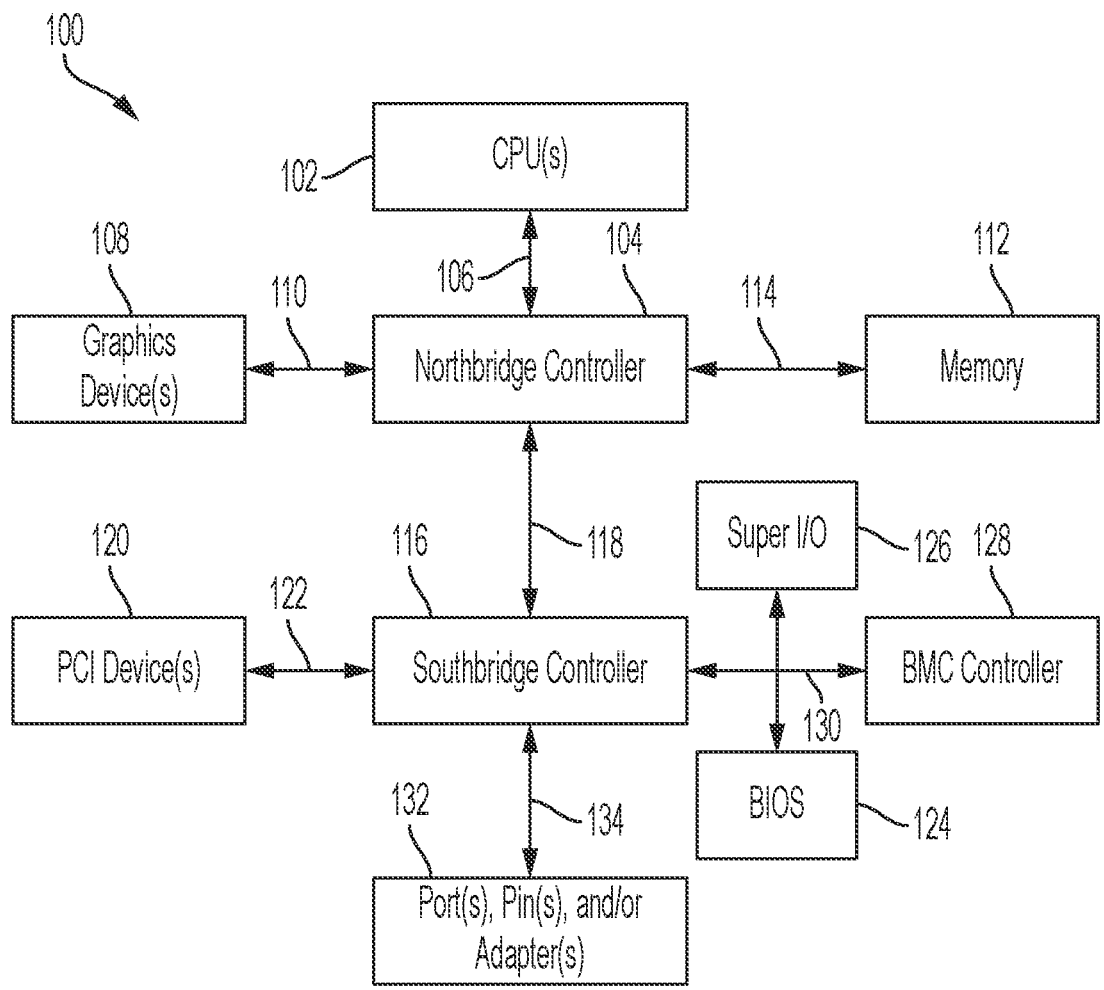
FIG. 7 is a schematic block diagram of an example information handling system according to some embodiments of the disclosure.

An information handling system may include a variety of components to generate, process, display, manipulate, transmit, and receive information. One example of an information handling system 100 is shown in FIG. 7. IHS 100 may include one or more central processing units (CPUs) 102. In some embodiments, IRS 100 may be a single-processor system with a single CPU 102, while in other embodiments IHS 100 may be a multi-processor system including two or more CPUs 102 (e.g., two, four, eight, or any other suitable number). CPU(s) 102 may include any processor capable of executing program instructions. For example, CPU(s) 102 may be processors capable of implementing any of a variety of instruction set architectures (ISAs), such as the x86, POWERPC®, ARM®, SPARC®, or MIPS® ISAs, or any other suitable ISA. In multi-processor systems, each of CPU(s) 102 may commonly, but not necessarily, implement the same ISA.

CPU(s) 102 may be coupled to northbridge controller or chipset 104 via front-side bus 106. The front-side bus 106 may include multiple data links arranged in a set or bus configuration. Northbridge controller 104 may be configured to coordinate I/O traffic between CPU(s) 102 and other components. For example, northbridge controller 104 may be coupled to graphics device(s) 108 (e.g., one or more video cards or adaptors, etc.) via graphics bus 110 (e.g., an Accelerated Graphics Port or AGP bus, a Peripheral Component Interconnect or PCI bus, etc.). Northbridge controller 104 may also be coupled to system memory 112 via memory bus 114. Memory 112 may be configured to store program instructions and/or data accessible by CPU(s) 102. In various embodiments, memory 112 may be implemented using any suitable memory technology, such as static RAM (SRAM), synchronous dynamic RAM (SDRAM), nonvolatile/Flash-type memory, or any other type of memory.

Northbridge controller 104 may be coupled to southbridge controller or chipset 116 via internal bus 118. Generally, southbridge controller 116 may be configured to handle various of IHS 100's I/O operations, and it may provide interfaces such as, for instance, Universal Serial Bus (USB), audio, serial, parallel, Ethernet, etc., via port(s), pin(s), and/or adapter(s) 132 over bus 134. For example, southbridge controller 116 may be configured to allow data to be exchanged between IHS 100 and other devices, such as other IHS s attached to a network. In various embodiments, southbridge controller 116 may support communication via wired or wireless data networks, such as any via suitable type of Ethernet network, via telecommunications/telephony networks such as analog voice networks or digital fiber communications networks, via storage area networks such as Fiber Channel SANs, or via any other suitable type of network and/or protocol.

Southbridge controller 116 may also enable connection to one or more keyboards, keypads, touch screens, scanning devices, voice or optical recognition devices, or any other devices suitable for entering or retrieving data. Multiple I/O devices may be present in IHS 100. In some embodiments, I/O devices may be separate from IHS 100 and may interact with IHS 100 through a wired or wireless connection. As shown, southbridge controller 116 may be further coupled to one or more PCI devices 120 (e.g., modems, network cards, sound cards, video cards, etc.) via PCI bus 122. Southbridge controller 116 may also be coupled to Basic I/O System (BIOS) 124, Super I/O Controller 126, and Baseboard Management Controller (BMC) 128 via Low Pin Count (LPC) bus 130.

IHS 100 may be configured to access different types of computer-accessible media separate from memory 112. Generally speaking, a computer-accessible medium may include any tangible, non-transitory storage media or memory media such as electronic, magnetic, or optical media, including a magnetic disk, a hard drive, a CD/DVD-ROM, and/or a Flash memory. Such mediums may be coupled to IHS 100 through various interfaces, such as universal serial bus (USB) interfaces, via northbridge controller 104 and/or southbridge controller 116. Some such mediums may be coupled to the IHS through a Super I/O Controller 126 combines interfaces for a variety of lower bandwidth or low data rate devices. Those devices may include, for example, floppy disks, parallel ports, keyboard and mouse and other user input devices, temperature sensors, and/or fan speed monitoring.

BIOS 124 may include non-volatile memory having program instructions stored thereon. The instructions stored on the BIOS 124 may be usable by CPU(s) 102 to initialize and test other hardware components. The BIOS 124 may further include instructions to load an Operating System (OS) for execution by CPU(s) 102 to provide a user interface for the IHS 100, with such loading occurring during a pre-boot stage. In some embodiments, firmware execution facilitated by the BIOS 124 may include execution of program code that is compatible with the Unified Extensible Firmware Interface (UEFI) specification, although other types of firmware may be used.

BMC controller 128 may include non-volatile memory having program instructions stored thereon that are usable by CPU(s) 102 to enable remote management of IHS 100. For example, BMC controller 128 may enable a user to discover, configure, and/or manage BMC controller 128. Further, the BMC controller 128 may allow a user to setup configuration options, resolve and administer hardware or software problems, etc. Additionally or alternatively, BMC controller 128 may include one or more firmware volumes, each volume having one or more firmware files used by the BIOS firmware interface to initialize and test components of IHS 100.

One or more of the devices or components shown in FIG. 1 may be absent, or one or more other components may be added. Further, in some embodiments, components may be combined onto a shared circuit board and/or implemented as a single integrated circuit (IC) with a shared semiconductor substrate. For example, northbridge controller 104 may be combined with southbridge controller 116, and/or be at least partially incorporated into CPU(s) 102. Accordingly, systems and methods described herein may be implemented or executed with other computer system configurations. In some cases, various elements shown in FIG. 1 may be mounted on a motherboard and enclosed within a chassis of the IHS 100.

The schematic flow chart diagram of FIG. 2 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
receiving, by an information handling system, a meeting record comprising a record of words spoken during a meeting and meeting timestamps comprising times when the words were spoken;
receiving, by the information handling system, meeting notes comprising notes written by one or more meeting participants and notes timestamps comprising times when the meeting notes were written;
correlating, by the information handling system, the meeting notes to the meeting record to generate correlated meeting text, wherein the correlating step comprises matching the notes timestamps to the meeting timestamps and wherein the correlated meeting text comprises the meeting record and the meeting notes;
determining, by the information handling system, topics from the correlated meeting text;
determining, by the information handling system, a number of words in the meeting notes corresponding to each of the topics;
determining, by the information handling system, an importance score associated with each topic based, at least in part, on the correlated meeting text and the number of words in the meeting notes corresponding to the topic; and
generating, by the information handling system, a meeting summary comprising the topics and associated importance scores.

2. The method of claim 1, further comprising, by the information handling system, converting the meeting record from audio data into text data after receiving the meeting record and wherein the correlated meeting text comprises the text data.

3. The method of claim 1, further comprising, by the information handling system, converting the meeting notes from handwritten symbols into text data after receiving the meeting notes and wherein the correlated meeting text comprises the text data.

4. The method of claim 1, wherein generating the meeting summary comprises generating a word heat map.

5. The method of claim 1, wherein generating the meeting summary comprises generating a prioritized meeting topic list.

6. The method of claim 1, wherein the determining an importance score step comprises determining a number of meeting participants that took meeting notes corresponding to the topic.

7. An apparatus, comprising: a processor and memory coupled to the processor, wherein the processor is configured for performing steps comprising:
receiving a meeting record comprising a record of words spoken during a meeting and meeting timestamps comprising times when the words were spoken;
receiving meeting notes comprising notes written by one or more meeting participants and notes timestamps comprising times when the meeting notes were written;
correlating the meeting notes to the meeting record to generate correlated meeting text, wherein the correlating step comprises matching the notes timestamps to the meeting timestamps and wherein the correlated meeting text comprises the meeting record and the meeting notes;
determining topics from the correlated meeting text;
determining a number of words in the meeting notes corresponding to each of the topics;
determining an importance score associated with each topic based, at least in part, on the correlated meeting text and the number of words in the meeting notes corresponding to the topic; and
generating a meeting summary comprising the topics and associated importance scores.

8. The apparatus of claim 7, wherein the processor is further configured to perform steps comprising converting the meeting record from audio data into text data after receiving the meeting record and wherein the correlated meeting text comprises the text data.

9. The apparatus of claim 7, wherein the processor is further configured to perform steps comprising converting the meeting notes from handwritten symbols into text data after receiving the meeting notes and wherein the correlated meeting text comprises the text data.

10. The apparatus of claim 7, wherein generating the meeting summary comprises generating a word heat map.

11. The apparatus of claim 7, wherein generating the meeting summary comprises generating a prioritized meeting topic list.

12. The apparatus of claim 7, wherein the determining an importance score comprises determining a number of meeting participants that took meeting notes corresponding to the topic.

13. An information handling system, comprising: a processor and a memory coupled to the processor, wherein the processor is configured to execute:
an audio processing service for converting meeting audio into a meeting transcript;
an optical character recognition service for converting handwritten notes into notes text;
a natural language processing service for converting the meeting transcript into meeting topics, the natural language processing service converts the notes text into notes topics and for converting the meeting transcript into meeting topics, and for converting the notes text into notes topics; and
a machine learning service for correlating the meeting topics with the notes topics to create correlated topics by matching meeting timestamps to notes timestamps and for generating a meeting summary by summarizing the correlated topics, wherein the machine learning service is configured to determine an importance score of a correlated topic by determining a number of words in the meeting notes corresponding to the correlated topic, wherein the meeting summary includes the importance score for each correlated topic.

14. The information handling system of claim 13, wherein the processor is further configured to execute a dashboard, wherein meeting participants view the meeting summary by accessing the dashboard.

15. The information handling system of claim 13, wherein the meeting summary comprises a word heat map.

16. The information handling system of claim 13, wherein the meeting summary comprises a prioritized meeting topic list.

17. The information handling system of claim 13, wherein the machine learning service is further configured to determine the importance score of a topic by determining a number of meeting participants that took meeting notes corresponding to the topic.

\* \* \* \* \*